(12) United States Patent
Kotas

(10) Patent No.: US 7,873,545 B1
(45) Date of Patent: Jan. 18, 2011

(54) SELECTING PROSPECTIVE BIDDERS TO WHOM TO PROMOTE AN ONLINE AUCTION BASED UPON BIDDING HISTORY

(75) Inventor: Paul Kotas, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 416 days.

(21) Appl. No.: 11/970,380

(22) Filed: Jan. 7, 2008

Related U.S. Application Data

(62) Division of application No. 09/742,273, filed on Dec. 19, 2000, now Pat. No. 7,318,042.

(60) Provisional application No. 60/171,843, filed on Dec. 22, 1999.

(51) Int. Cl.
*G06Q 40/00* (2006.01)
(52) U.S. Cl. .......................................... 705/26; 705/10
(58) Field of Classification Search .................. 705/26, 705/10
See application file for complete search history.

(56) References Cited

U.S. PATENT DOCUMENTS

| 6,317,722 | B1 | 11/2001 | Jacobi et al. | |
|---|---|---|---|---|
| 6,549,904 | B1 | 4/2003 | Ortega et al. | |
| 2005/0261987 | A1* | 11/2005 | Bezos et al. | 705/27 |
| 2006/0218076 | A1* | 9/2006 | Walker et al. | 705/37 |

OTHER PUBLICATIONS

Anonymous, "U.S. and U.K. Execs View the Marketing Arena," National Underwriter (Life/Health) v90n32, pp. 3, Aug. 9, 1986.
Orr, A., "Best Ideas for Fundraising by Phone," Target Marketing v21n9, pp. 48-51, Sep. 1998.

* cited by examiner

*Primary Examiner*—Jagdish N Patel
(74) *Attorney, Agent, or Firm*—Thomas, Kayden, Horstemeyer & Risley, LLP

(57) ABSTRACT

A facility for identifying users to whom to promote a selected auction is described. The facility maintains a representation of bidding histories of a plurality of users. At a point at which certain users have already bid in the selected auction, the facility identifies users that have not already bid in the selected auction that have bidding histories that are similar to those of users that have already bid in the selected auction. The facility then promotes the selected auction to the identified users.

20 Claims, 4 Drawing Sheets

SELECTING PROSPECTIVE BIDDERS TO WHOM TO PROMOTE AN ONLINE AUCTION BASED UPON BIDDING HISTORY

CROSS-REFERENCE TO RELATED APPLICATION

This application is a divisional of U.S. patent application Ser. No. 09/742,273 filed Dec. 19, 2000 entitled "SELECTING PROSPECTIVE BIDDERS TO WHOM TO PROMOTE AN ONLINE AUCTION BASED UPON BIDDING HISTORY," which application claims the benefit of U.S. Provisional Patent Application No. 60/171,843 filed Dec. 22, 1999 which are hereby incorporated by reference in their entireties.

TECHNICAL FIELD

The present invention is directed to the field of electronic commerce, and, more particularly, to the field of online marketing techniques.

BACKGROUND

The auction is a sales technique in which prospective buyers are permitted to bid on an item offered for sale, and the item is sold to the bidder submitting the highest bid.

Online auctions have recently emerged, in which auctions are conducted on a World Wide Web site or in a similar environment. Users of computer systems connected to the computer system on which the online auction is conducted can view descriptions and pictures of items offered for sale, as well as bid on items using their computer systems.

Operators of online auctions derive revenue from the online auctions in a variety of ways. For example, an online auction operator may charge sellers a flat sales fee to auction each item, or may charge sellers a sales fee measured by a percentage of the sale price. Alternatively, an online auction operator may sell advertising that is viewed by sellers and/or bidders.

Generally, however, the level of profitability of online auctions to their operator is directly related to the average number of bidders that bid in each auction. Where an auction operator charges sellers a sales fee measured by a percentage of the sale price, a larger number of bidders produces a higher sales price, from which the operator collects a higher sales fee. Where an auction operator charges sellers a sales fee of any kind, a larger number of bidders produces a higher sales price, and a larger seller profit, thereby encouraging sellers to initiate more auctions that produce more sales fees for the operator. Where an auction operator sells advertising on the auction site, a larger number of bidders produces a larger number of advertising impressions, and therefore greater advertising revenue.

Accordingly, an effective technique for increasing the number of bidders bidding in an online auction would have significant utility.

DETAILED DESCRIPTION

A software facility for selecting prospective bidders to whom to promote an online auction based upon bidding history ("the facility") is provided. The facility operates in conjunction with an online auction system that tracks the users bidding on each of a number of online auctions.

For an auction selected for promotion, the facility obtains a list of the bidders that have bid in the selected auction. The facility uses this list to identify other auctions, either completed or in progress, in which at least a threshold percentage of the bidders in the selected auction have also bid. In each identified auction, the facility identifies the bidders that have not yet bid on the selected auction. The facility may also use clustering techniques to identify users having bidding histories that are similar to those of the bidders in the selected auction.

The facility then promotes the selected auction to the identified bidders. In some embodiments, the facility sends an email message to the identified bidders suggesting that they bid in the selected auction. In other embodiments, the facility displays a suggestion to bid in the selected auction on a web page served to the identified bidders.

In this manner, the facility promotes the selected auction to a group of bidders that both (1) is likely to be receptive to receiving information about the selected auction, and (2) is likely to actually bid in the selected auction, thereby increasing the number of bidders in the selected auction and increasing profitability for the auction operator.

In additional embodiments, the facility is applied to markets other than online auctions, such as web merchants that sell items for a fixed price. Where a large percentage of the purchasers of a first item also purchase a second item, the facility preferably promotes the first item to purchasers of the second item that have not purchased the first item, and vice versa.

Further embodiments of the facility are applied across markets. For example, where a large percentage of the users that purchased a particular item from a web merchant also bid in a particular auction, the facility preferably promotes the auction to the purchasers that have not yet bid, and the purchase to the bidders that have not yet purchased.

Figure 1:
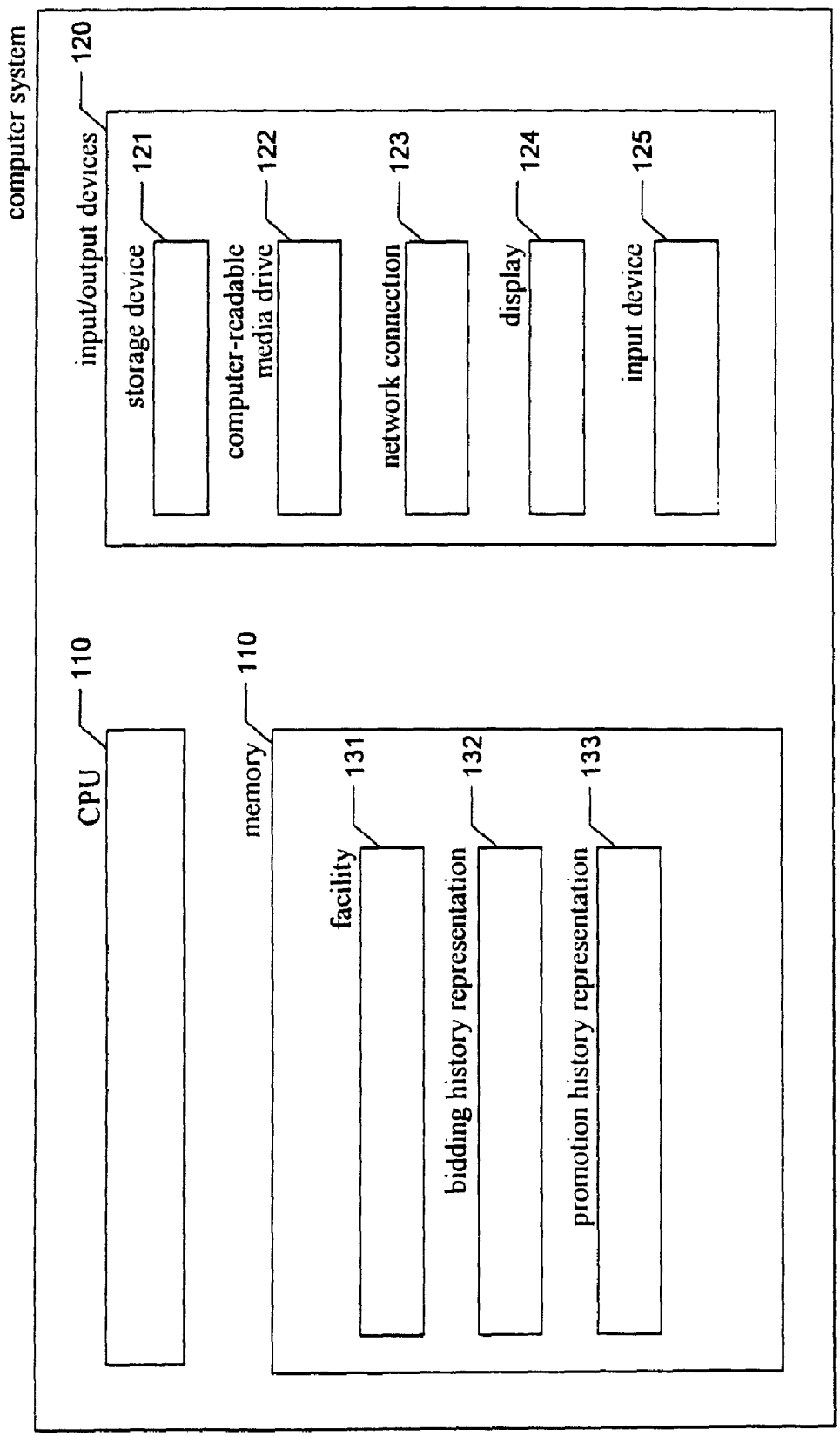
FIG. 1 is a high-level block diagram of the computer system upon which the facility preferably executes.

FIG. 1 is a high-level block diagram of the computer system upon which the facility preferably executes. The computer system 100 contains one or more central processing units (CPUs) 110, input/output devices 120, and a computer memory (memory) 130. Among the input/output devices is a persistent storage device 121, such as a hard disk drive, and a computer-readable media drive 122, which can be used to install software products, including components of the facility, which are provided on a computer-readable medium, such as a CD-ROM. The input/output devices also include a network connection 123, through which the computer system 100 may by connected to the network to be analyzed by the facility. The memory 130 preferably contains the prospective bidder identification facility 131, as well as a bidding history representation 132 and a promotion history representation 133 both preferably generated and used by the facility. While items 131-133 are preferably stored in memory while being used, those skilled in the art will appreciate that these items, or portions of them, may be transferred between memory and the persistent storage device for purposes of memory management and data integrity. While the facility is preferably implemented on a computer system configured as described above, those skilled in the art will recognize that it may also be implemented on computer systems having different configurations, or distributed across multiple computer systems.

To more fully illustrate its implementation and operation, the facility is described in conjunction with an example.

Figure 2:
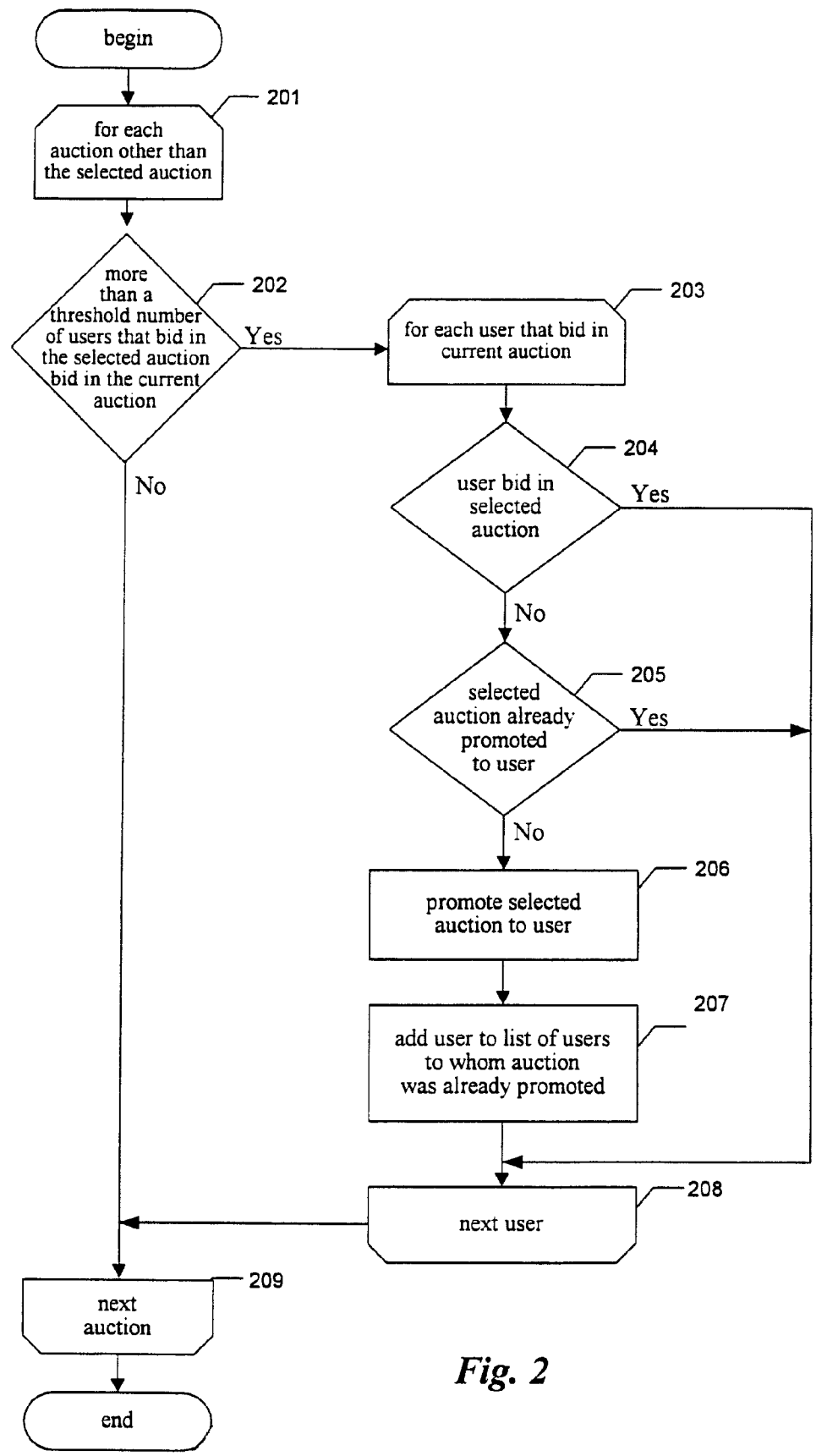
FIG. 2 is a flow diagram showing the steps preferably performed by the facility in order to identify users to whom to promote a selected online auction once the auction has begun based upon the identities of the users that have already bid in other auctions.

FIG. 2 is a flow diagram showing the steps preferably performed by the facility in order to identify users to whom to promote a selected online auction once the auction has begun based upon the identities of the users that have already bid in other auctions. In steps 201-209, the facility loops through each of a set of auctions other than the selected auction in which users have bid. In a preferred embodiment, the set of auctions includes both incomplete and completed auctions. In step 202, if more than a threshold number of users that bid in the selected auction bid in the current auction, then the facility continues in step 203, else the facility continues in step 209. The threshold used by the facility may be either an absolute threshold expressed in number of users, or a relative threshold, expressed as a percentage of the users bidding in the selected auction. In one embodiment, the facility uses the relative threshold of seventy percent of the users bidding in the selected auction.

In steps 203-208, the facility loops through each user that bid in the current auction. In step 204, if the user has also already bid in the selected auction, then the facility continues in step 208 to skip the user, else the facility continues in step 205. In step 205, if the selected auction has already been promoted to the user, then the facility continues in step 208 to skip the user, else the facility continues in step 206. In step 206, the facility promotes the auction to the user, since the user bid in a related auction, but has not yet bid in the selected auction or had the selected auction promoted to him or her. The process of promoting the selected auction to a user is discussed in greater detail below in conjunction with FIG. 4. In step 207, the facility adds the user to the list of users to whom the auction has been promoted. In step 208, if additional users remain, then the facility loops back to step 203 to process the next user. After the loop of steps 203-208 has completed, the facility continues in step 209. In step 209, if additional auctions in the set remain, then the facility loops back to step 201 to process the next auction in the set. After the loop of steps 201-209 is completed, these steps conclude.

Tables 1 and 2 below show the result of applying the steps shown in FIG. 2 to sample auctions. Table 1 shows the state in which the facility identifies users to whom to promote an auction called auction 3.

TABLE 1

| auction 1 bidders | auction 2 bidders | auction 3 bidders | auction 3 already promoted to |
|---|---|---|---|
| user 1 | user 2 | user 7 | user 5 |
| user 2 | user 5 | user 11 | user 22 |
| user 3 | user 7 | user 12 | |
| user 4 | user 11 | user 13 | |
| user 5 | user 12 | | |
| user 6 | user 19 | | |
| user 7 | user 22 | | |

Table 1 shows a list of the users that have bid in auction 1, a list of the users that have bid in auction 2, a list of the users that have bid in auction 3, and a list of the users to whom auction 3 has already been promoted. In order to identify users to whom to promote auction 3, the facility examines the lists of users that have bid in auctions 1 and 2. In the example, the facility applies the threshold that, in order for another auction to be considered, at least seventy percent of the users that bid in the selected auction must have bid in the other auction. In terms of the number of users that have bid in auction 3 in the example, this means that at least three of the users that have bid in auction 3 must have bid in each of the other two auctions for them to be considered (4×70%=2.8).

It can be seen that only one of the users that bid in auction 3 (user 7) also bid in auction 1. Since 1 is less than 3, the facility does not use the list of users that have bid in auction 1. On the other hand, it can be seen that three of the users that bid in auction 3 (user 7, user 11, and user 12) also bid in auction 2. Because 3 is at least as large as 3, the list of users that have bid in auction 2 is considered. The facility considers the list of users that have bid in auction 2 as follows: user 2 has not bid in auction 3, and auction 3 has not yet been promoted to user 2, so the facility promotes auction 3 to user 2; auction 3 has already been promoted to user 5, so the facility does not promote auction 3 to user 5; user 7 has already bid in auction 3, so the facility does not promote auction 3 to user 7; user 11 has already bid in auction 3, so the facility does not promote auction 3 to user 11; user 12 has already bid in auction 3, so the facility does not promote auction 3 to user 12; user 19 has not bid in auction 3, and auction 3 has not yet been promoted to user 19, so the facility promotes auction 3 to user 19; and auction 3 has already been promoted to user 22, so the facility does not promote auction 3 to user 22. Accordingly, in applying the steps shown in FIG. 2, the facility determines to promote auction 3 to the users shown in Table 2 below.

TABLE 2

| promote auction 3 to |
|---|
| user 2 |
| user 19 |

In some embodiments, the facility preferably uses clusters of users that are generated in such a way that the users in each cluster have similar bidding histories. Such clusters are preferably generated using well-known clustering techniques, such as those described in Anil K. Jain and Richard C. Dubes, *Algorithms for Clustering Data*, 1988, pp. 629-799; Phipps Arabie et al., *Clustering and Classification*, 1996; Richard A. Johnson and Dean A. Wichern, *Applied Multivariate Statistical Analysis*, 1998; and/or Leonard Kaufman and Peter J. Rousseau, *Finding Groups in Data: An Introduction to Cluster Analysis*, 1990.

Figure 3:
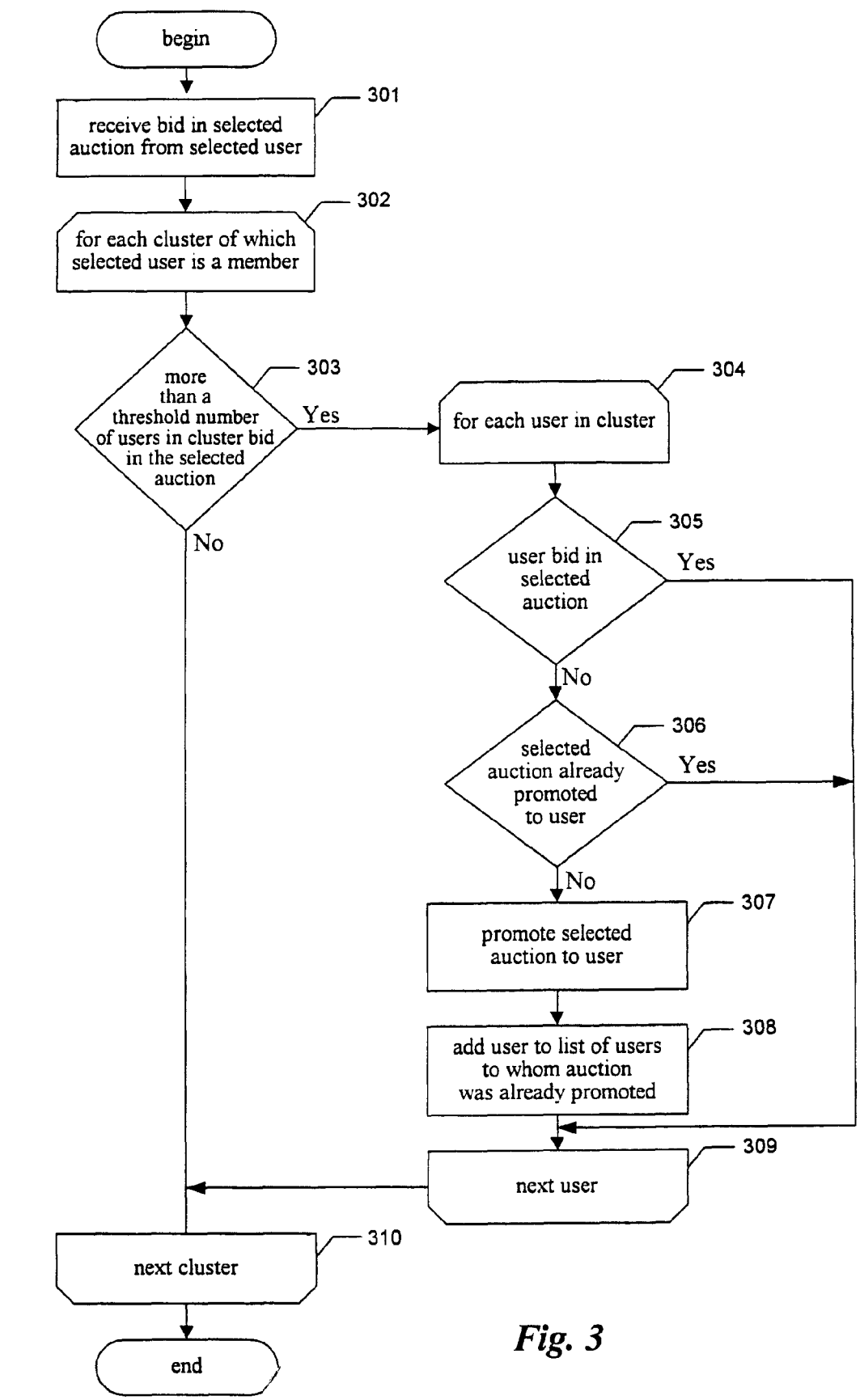
FIG. 3 is a flow diagram showing the steps preferably performed by the facility in order to identify users to whom to promote a selected online auction once the auction has begun using clusters of users each having similar bidding histories.

FIG. 3 is a flow diagram showing the steps preferably performed by the facility in order to identify users to whom to promote a selected online auction once the auction has begun using clusters of users each having similar bidding histories. The facility preferably performs these steps once for each bid that is received in the selected auction. In some embodiments, these steps are only performed in response to a user's first bid in the selected auction. The steps may be performed directly in response to each bid, or may be deferred for later performance in a batch mode. In step 301, the facility receives a bid in the selected auction from a selected user. In steps 302-310, the facility loops through each of a set of user clusters to which the selected user belongs. In step 303, if more than a threshold number of users in the current cluster bid in the selected auction, then the facility continues in step 304, else the facility continues in step 310. The threshold used by the facility may be either an absolute threshold expressed in number of users, or a relative threshold, expressed as a percentage of users in the current cluster. In one embodiment, the facility uses the relative threshold of fifty percent of the users in the current cluster. In steps 304-309, the facility loops through each user in the current cluster. In step 305, if the current user bid in the selected auction, then the facility continues in step 309 to skip the user, else the facility continues in step 306. In step 306, if the selected auction has already been promoted to the current user, then the facility continues in step 309 to skip the current user, else the facility continues in step 307. In step 307, the facility promotes the auction to the current user, since the current user is a member of the cluster, but has not yet bid in the selected auction or had the selected auction promoted to him or her. The process of promoting the selected auction to a user is discussed in greater detail below in conjunction with FIG. 4. In step 308, the facility adds the user to the list of users to whom the auction has been promoted. In step 309, if additional users remain in the cluster, then the facility loops back to step 303 to process the next user. After the loop of steps 304-309 has completed, the facility continues in step 310. In step 310, if additional clusters remain, then the facility loops back to step 302 to process the next cluster. After the loop of steps 302-310 is completed, these steps conclude.

Tables 3 and 4 below show the result of applying the steps shown in FIG. 3 to sample auctions and clusters. Table 3 shows the state in which the facility identifies users to whom to promote auction 3.

TABLE 3

| cluster 1 members | cluster 2 members | auction 3 bidders | auction 3 already promoted to |
|---|---|---|---|
| user 7 | user 7 | user 7 | user 5 |
| user 8 | user 8 | user 11 | user 22 |
| user 24 | user 11 | user 12 | |
| user 27 | user 12 | user 13 | |
| user 99 | user 13 | | |
| user 101 | user 19 | | |
| | user 22 | | |

Table 3 shows a list of the users in cluster 1, a list of the users in cluster 2, a list of the users that have been in auction 3, and a list of the users to whom auction 3 has already been promoted. In order to identify users to whom to promote auction 3, the facility examines the lists of users that are members of clusters 1 and 2. In the example, the facility applies the threshold that, in order for a cluster to be considered, at least fifty percent of the users in the cluster must have bid in the selected auction. It can be seen that only one of the six in cluster 1 (user 7) is among the four users that have bid in auction 3. Because seventeen percent (1 user÷6 users=17%) is less than fifty percent, the facility does not use the list of users in cluster 1. On the other hand, it can been seem that four of the seven members of cluster 2 (user 7, user 11, user 12, and user 13) have bid in auction 3. Because fifty-seven percent (4 user÷7 users=57%) is greater than fifty percent, the list of users in cluster 2 is considered. The facility considers the list of users in cluster 2 as follows: user 7 has already bid in auction 3, so the facility does not promote auction 3 to user 7. User 8 has not bid in auction 3, and auction 3 has not yet been promoted to user 8, so the facility promotes auction 3 to user 8; user 11 has already bid in auction 3, so the facility does not promote auction 3 to user 11; user 12 has already bid in auction 3, so the facility does not promote auction 3 to user 12; user 13 has already bid in auction 3, so the facility does not promote auction 3 to user 13; user 19 has not bid in auction 3, and auction 3 has not yet been promoted to user 19, so the facility promotes auction 3 to user 19; and auction 3 has already been promoted to user 22, so the facility does not promote auction 3 to user 22. Accordingly, in applying the steps shown in FIG. 3, the facility determines to promote auction 3 to the user shown in Table 4 below.

TABLE 4

| promote auction 3 to |
|---|
| user 8 |
| user 19 |

Figure 4:
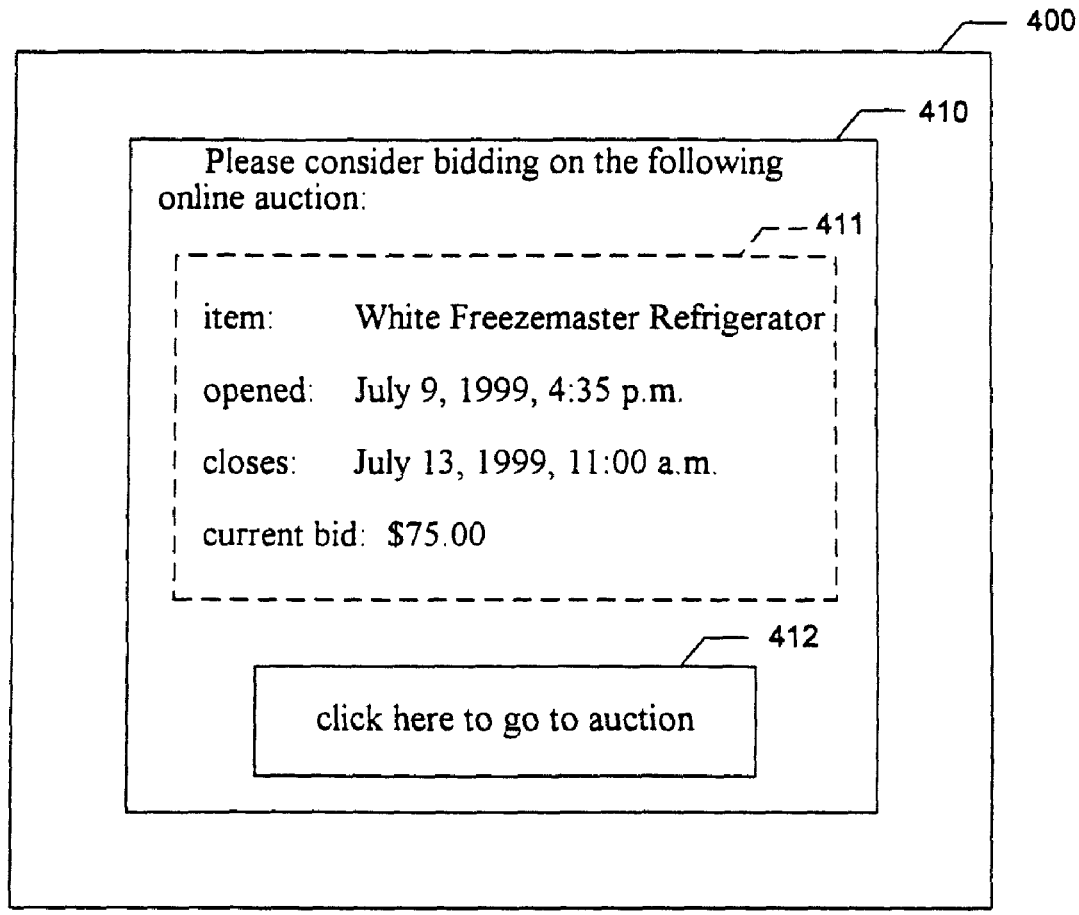
FIG. 4 is a display diagram showing the manner in which the facility preferably promotes an auction to identified users.

FIG. 4 is a display diagram showing the manner in which the facility preferably promotes an auction to identified users. FIG. 4 shows that a promotion 410 is displayed on a display 400. The promotion may preferably be sent to a user an email message, as an ICQ instant message, or as another type of message. The promotion may further be presented to the user as a web page, either when the user visits a web site for the operator of the facility, or when the user visits another, associated web site. The promotion may also be provided in audio form, such as in an automatically initiated telephone call or an automatically delivered voicemail message. Those skilled in the art will appreciate that there are additional media through which the facility can also provide promotions to selected users.

The promotion 410 invites the user to consider bidding on the selected auction. The promotion includes information 411 about the auction, such as a description of the item offered for sale, the time at which the auction opened, the time at which the auction will close, and the current bid amount. Those skilled in the art will appreciate that other information about the selected auction could also be included. The promotion preferably further includes a visual control 412, such as a button, that the user may operate in order to open the web page used by users to bid in the selected auction.

It will be understood by those skilled in the art that the above-described facility could be adapted or extended in various ways. While the foregoing description makes reference to preferred embodiments, the scope of the invention is defined solely by the claims that follow and the elements recited therein.

I claim:

1. A method in a computer system for identifying users to whom to promote a selected auction, the selected auction having users that have already bid in the selected auction, the method comprising:
   maintaining, in the computer system, a representation of bidding histories of a plurality of users that is a superset of the users that have already bid in the selected auction, each of the bidding histories including a list of auctions in which the respective one of the users has entered a bid; and
   identifying, in the computer system, users that have not already bid in the selected auction that have bidding histories that substantially match those of users that have already bid in the selected auction.

2. The method of claim 1 wherein users are identified using clustering techniques.

3. The method of claim 1, further comprising promoting the selected auction to the identified users.

4. The method of claim 1, further comprising transmitting electronic mail messages to the identified users promoting the selected auction to them.

5. The method of claim 1, further comprising, when any of the identified users request a selected web page:
   incorporating in the selected web page information promoting the selected auction; and
   after such incorporation, returning the selected web page to the user.

6. A non-transitory computer-readable medium whose contents cause a computer system to identify users to whom to identify users to whom to promote a selected auction, the selected auction having users that have already bid in the selected auction, by:
   maintaining a representation of bidding histories of a plurality of users that is a superset of the users that have already bid in the selected auction, each of the bidding histories including a list of auctions in which the respective one of the users has entered a bid; and
   identifying users that have not already bid in the selected auction that have bidding histories that are similar to those of users that have already bid in the selected auction, wherein a first bidding history is similar to a second bidding history when at least a quantity of auctions included in the first bidding history match auctions included in the second bidding history, the quantity being determined using clustering techniques.

7. The non-transitory computer-readable medium of claim 6 wherein users are identified using clustering techniques.

8. The non-transitory computer-readable medium of claim 6 wherein the contents of the computer-readable medium further cause the computer system to promote the selected auction to the identified users.

9. The non-transitory computer-readable medium of claim 6 wherein the contents of the computer-readable medium further cause the computer system to transmit electronic mail messages to the identified users promoting the selected auction to them.

10. The non-transitory computer-readable medium of claim 6 wherein the contents of the computer-readable medium further cause the computer system to, when any of the identified users request a selected web page:
    incorporate in the selected web page information promoting the selected auction; and
    after such incorporation, return the selected web page to the user.

11. A computer system for identifying users to whom to promote a selected auction, the selected auction having users that have already bid in the selected auction, comprising:
    a memory that maintains a representation of bidding histories of a plurality of users that is a superset of the users that have already bid in the selected auction, each of the bidding histories including a list of auctions in which the respective one of the users has entered a bid; and
    a processor that identifies users that have not already bid in the selected auction that have bidding histories that are similar to those of users that have already bid in the selected auction, wherein a first bidding history is similar to a second bidding history when at least a quantity of auctions included in the first bidding history match auctions included in the second bidding history, the quantity being determined using clustering techniques.

12. The computer system of claim 11 wherein the processor identifies users using clustering techniques.

13. The computer system of claim 11, further comprising a promotion subsystem that promotes the selected auction to the identified users.

14. The computer system of claim 11, further comprising a transmission subsystem that transmits electronic mail messages to the identified users promoting the selected auction to them.

15. The computer system of claim 11, further comprising an incorporation subsystem that, when any of the identified users request a selected web page:
    incorporating in the selected web page information promoting the selected auction; and
    after such incorporation, returning the selected web page to the user.

16. A computer system for identifying users to whom to promote a selected auction, the selected auction having users that have already bid in the selected auction, the computer system comprising:
    means for maintaining a representation of bidding histories of a plurality of users that is a superset of the users that have already bid in the selected auction, each of the bidding histories including a list of auctions in which the respective one of the users has entered a bid; and
    means for identifying users that have not already bid in the selected auction that have bidding histories that are similar to those of users that have already bid in the selected auction, wherein a first bidding history is similar to a second bidding history when at least a predefined number of auctions included in the first bidding history match auctions included in the second bidding history.

17. The computer system of claim 16 wherein users are identified using clustering techniques.

18. The computer system of claim 16, further comprising means for promoting the selected auction to the identified users.

19. The computer system of claim 16, further comprising means for transmitting electronic mail messages to the identified users promoting the selected auction to them.

20. The computer system of claim 16, further comprising means for, when any of the identified users request a selected web page:
    incorporating in the selected web page information promoting the selected auction; and
    after such incorporation, returning the selected web page to the user.

* * * * *

UNITED STATES PATENT AND TRADEMARK OFFICE
CERTIFICATE OF CORRECTION

Page 1 of 1

PATENT NO.         : 7,873,545 B1
APPLICATION NO.    : 11/970380
DATED              : January 18, 2011
INVENTOR(S)        : Paul Kotas It is certified that error appears in the above-identified patent and that said Letters Patent is hereby corrected as shown below:

Column 7, line 9 (claim 6): delete "to identify users to whom".

Signed and Sealed this
Thirteenth Day of September, 2011

David J. Kappos
*Director of the United States Patent and Trademark Office*